United States Patent [19]

Guerrero

[11] Patent Number: 4,511,937
[45] Date of Patent: Apr. 16, 1985

[54] INERTIAL TAPE POSITIONING METHOD AND APPARATUS

[75] Inventor: Manuel A. Guerrero, Ft. Lauderdale, Fla.

[73] Assignee: Sony Corporation, Tokyo, Japan

[21] Appl. No.: 475,338

[22] Filed: Mar. 14, 1983

[51] Int. Cl.³ ............................................. G11B 15/22
[52] U.S. Cl. .................................... 360/72.1; 360/74.1
[58] Field of Search ........................ 242/186, 187, 191; 360/72.1, 72.2, 72.3, 74.1, 74.2, 74.4

[56] References Cited

U.S. PATENT DOCUMENTS 4,461,433  7/1984  Kani .................................. 242/75.51

Primary Examiner—George G. Stellar
Attorney, Agent, or Firm—Lewis H. Eslinger; Alvin Sinderbrand

[57] ABSTRACT

In combination with a tape machine having at least one reel with a tape wound thereon, a device is provided which positions the tape at a predetermined point and comprises a tape speed sensor which generates speed signals indicative of variations in the speed of the tape while the tape is wound in respect to the reel, a calculator which receives the speed signals and calculates the inertia of the wound tape from them, and a control circuit which generates control signals to stop the tape machine with the tape positioned at the predetermined point in response to the calculated inertia of the tape.

21 Claims, 9 Drawing Figures

INERTIAL TAPE POSITIONING METHOD AND APPARATUS

BACKGROUND OF THE INVENTION

1. Field of the Invention

This invention relates to tape machines for winding a tape, and more particularly, to a method and apparatus for accurately positioning a tape at a predetermined point by measuring in real time the inertia of the tape.

2. Description of the Prior Art

A magnetic tape is wound from a supply reel to a take-up reel on a tape machine. In performing tape operations with such a machine, it is often desirable quickly to position the tape at a predetermined point. For example, it may be desirable to position a magnetic tape containing audio information at the beginning of a musical selection which is located at a predetermined distance away from the beginning of the tape. In such an instance, the tape is advanced at a high speed in the so-called fast-forward mode of operation in order to position the tape at the predetermined point.

At least two methods have been used accurately to position a magnetic tape at a predetermined point. In one method, a fixed deceleration rate (or ramp) is applied to the tape when the tape is close to the predetermined point. In an alternate method, a variable deceleration rate or ramp is used to stop the winding of the tape. The variable deceleration rate or ramp is changed according to the amount of overshoot or undershoot which occurred in the last attempt to position the tape at the predetermined point.

The prior art methods of positioning a tape at a predetermined point suffer from significant drawbacks, however. The first method, using a fixed ramp, is very inefficient because the ramp must be calculated for the worst possible case which, of course, does not apply to all instances. When the tape is not the worst case, for example, it is not accurately positioned at the predetermined point. The second method, changing the ramp in accord with previous attempts, requires multiple attempts at positioning the tape at the predetermined point so that the amount of overshoot or undershoot can first be calculated and then applied to make the next attempt accurate.

SUMMARY OF THE INVENTION

It is therefore an object of the present invention to provide a method and apparatus for accurately positioning a tape at a predetermined point which avoids the above-described problems inherent in the prior art.

It is a further object of the present invention to optimize the time required to wind a tape and position it at a predetermined point.

In accordance with the present invention, a device is provided in combination with a tape machine having at least one reel with a tape wound thereon which positions the tape at a predetermined point and includes tape speed sensing means for generating speed signals indicative of variations in the speed of the tape while the tape is wound in respect to the reel, calculator means for receiving the speed signals and calculating the inertia of the wound tape in response thereto, and control means for generating control signals to stop the tape machine with the tape positioned at the predetermined point in response to the calculated inertia of the tape.

In accordance with the method of the present invention, a tape wound on at least one reel of a tape machine is positioned at a predetermined point by winding the tape in respect to the reel while moving the tape toward the predetermined point at a preset speed, determining the inertia of the tape while the tape is winding, and stopping the tape at the predetermined point in response to the determination of the inertia of the wound tape.

The above, and other objects, features and advantages of the present invention will be apparent from the following detailed description of an illustrative embodiment thereof which is to be read in connection with the accompanying drawings.

DETAILED DESCRIPTION OF THE PREFERRED EMBODIMENT

Figure 1:
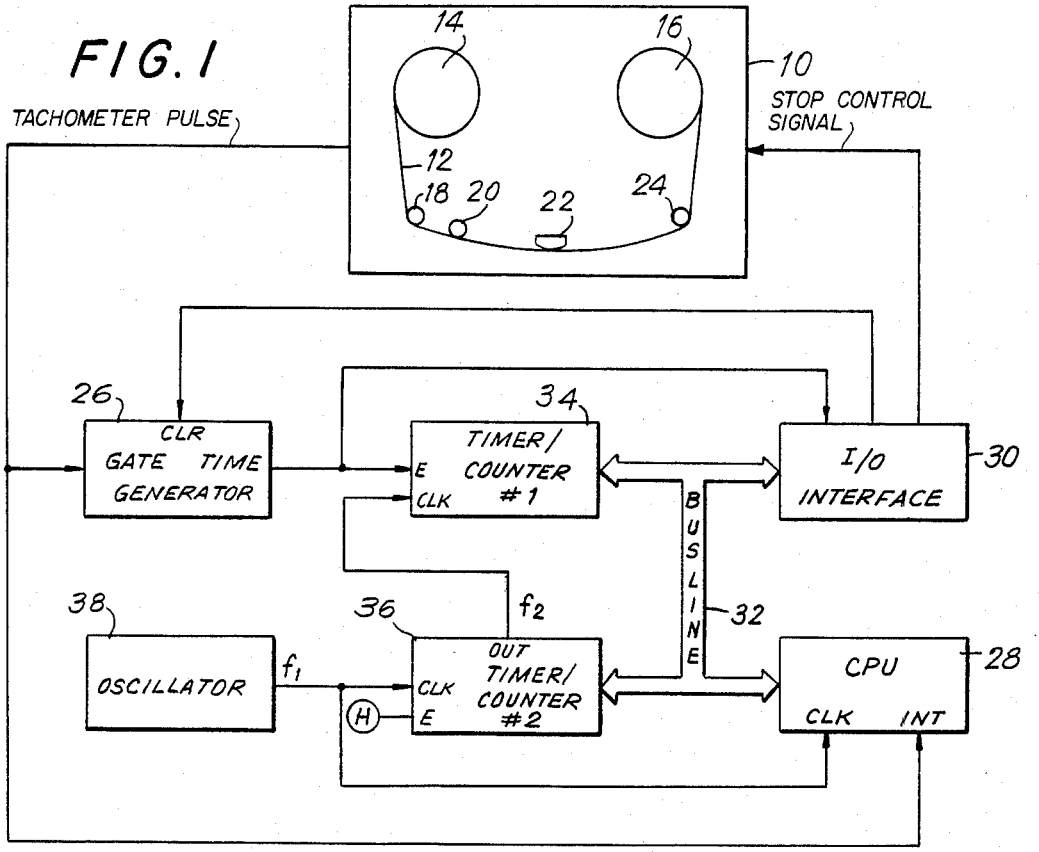
FIG. 1 is a block diagram of an apparatus for accurately positioning a tape at a predetermined point in accordance with the present invention.

Referring to the drawings, and initially to FIG. 1 thereof, a tape machine 10, which may be, for example, a tape recorder or the like, has a magnetic tape 12 wound from a supply reel 14 to a tape-up reel 16. Tape 12 unwinds from supply reel 14 past a first roller 18, a tachometer 20 (to be explained more fully hereinbelow), a recording and/or reproducing head 22, and a second roller 24. In the embodiment of FIG. 1, tape machine 10 is illustrated as a reel-to-reel audio tape recorder. It is to be appreciated that tape machine 10 is not limited to such a device, and may be, for example, an audio cassette tape recorder, a video cassette recorder or the like.

Tachometer 20 generates tach pulses in accord with the linear speed of tape 12. The tach pulses from tachometer 20 are supplied to a gate-time generator 26 and an interrupt terminal INT of a central processing unit (CPU) 28. The circuit of FIG. 1 includes an I/O interface 30 coupled through a bus line 32 to CPU 28. In one example, CPU 28 was an Intel 8085 microprocessor and I/O interface 30 was an Intel 8255 programmable I/O chip. A person of ordinary skill in the art will recognize that other suitable microprocessors can be used for CPU 28 and that other latched I/O chips can be used for I/O interface 30. A timer/counter 34 is connected through I/O interface 30 and bus line 32 to CPU 28. A second timer/counter 36 is coupled through bus line 32 to CPU 28. An oscillator 38 generates high frequency clock pulses $f_1$ which are supplied to a clock input terminal CLK of timer/counter 36 and to a clock input terminal CLK of CPU 28.

In a preferred embodiment, oscillator 38 generates clock pulses having a frequency of about 2 MHz which are supplied to the clock input terminal CLK of timer/counter 36. Timer/counter 36 acts as a frequency divider to supply at its output terminal OUT second clock signals $f_2$. Second clock signals $f_2$ may have, for example, a frequency of 32 KHz. Second clock signals $f_2$ are supplied to a clock input terminal CLK of timer/counter 34.

Gate-time generator 26 supplies an enable signal to the enable terminal E of timer/counter 34. The enable signal from gate-time generator 26 actuates timer/counter 34 to determine when timer/counter 34 will perform a counting function on the second clock signals $f_2$ supplied from timer/counter 36. The enable signal from gate-time generator 26 is also supplied to CPU 28 through I/O interface 30 and bus line 32.

CPU 28 generates control signals to control the speed of tape 12 mounted on tape machine 10. The control signals for tape machine 10 are supplied along bus line 32 to I/O interface 30 which interfaces between tape machine 10 and CPU 28.

Figure 2:
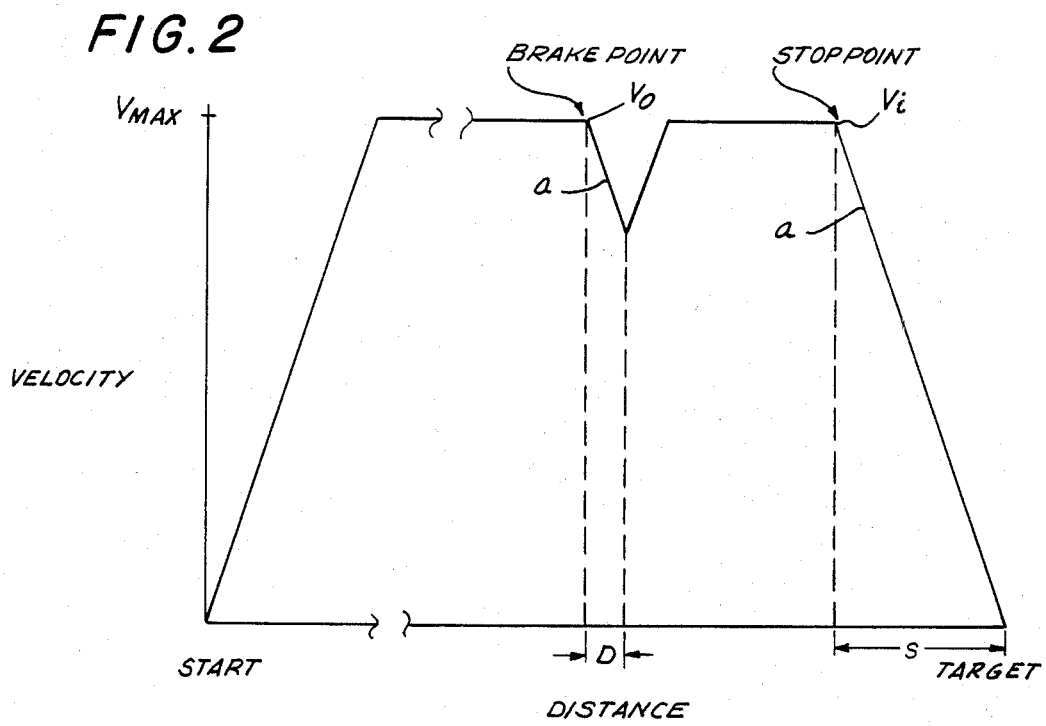
FIG. 2 is a diagram to which reference will be made in explaining the method and apparatus of the present invention.

The operation of the circuit of FIG. 1 will now be described with reference to FIGS. 2 to 4. As illustrated in FIG. 2, CPU 28 supplies control signals to tape machine 10 to begin the winding operation of magnetic tape 12 after tape 12 has been completely rewound. Tape 12 is first wound at a velocity $V_{max}$ until tape 12 begins to approach the predetermined stop point, identified in FIG. 2 as the target.

As described more fully hereinbelow, the inertia of magnetic tape 12 is calculated at a brake point, and the value thereof is used in determining the precise point at which tape machine 10 is placed in a stop mode in order to position tape 12 at the target. The brake point is chosen to be close to the target since the mass of the tape shifts from supply reel 14 to take-up reel 16 as the tape winds from one to the other. Accordingly, the inertia continuously changes as tape 12 winds from supply reel 14 to tape-up reel 16. By positioning the brake point in the proximity of the target, the measurements for the inertia are substantially the same as those which apply at the precise stopping point for tape machine 10.

After the inertia of tape 12 has been calculated at the brake point, CPU 28 generates control signals so that tape machine 10 increases the speed of tape 12 to its predetermined maximum $V_{max}$. As more fully described hereinbelow, CPU 28 then generates control signals to stop tape machine 10 with tape 12 positioned at the target.

The calculation of the inertia of tape 12 at the brake point will next be described. In determining the brake point, CPU 28 is preset with information for the location of the target. The location can be, for example, a preset distance along tape 12.

When CPU 28 determines that magnetic tape 12 is positioned at the brake point, the instantaneous velocity of tape 12 is calculated. As illustrated in FIGS. 3 and 4, tachometer 20 generates a tach pulse at a predetermined interval of length d. In the embodiment illustrated in FIG. 4, four tach pulses are generated for each complete rotation of a roller 40 which is in contact with tape 12. As described hereinbefore, the tach pulses are supplied to gate-time generator 26 and to interrupt terminal INT of CPU 28. When the tach pulses are supplied to CPU 28, CPU 28 generates a clear pulse CLR through bus line 32 and I/O interface 30 to a clear input terminal CLR of gate-time generator 26. Gate-time generator 26 must be cleared each time a measurement of the velocity is to be performed and operates in a one-shot mode. Accordingly, the clearing of gate-time generator 26 prevents the hardware in the circuit of FIG. 1 from outrunning CPU 28.

Figure 3:
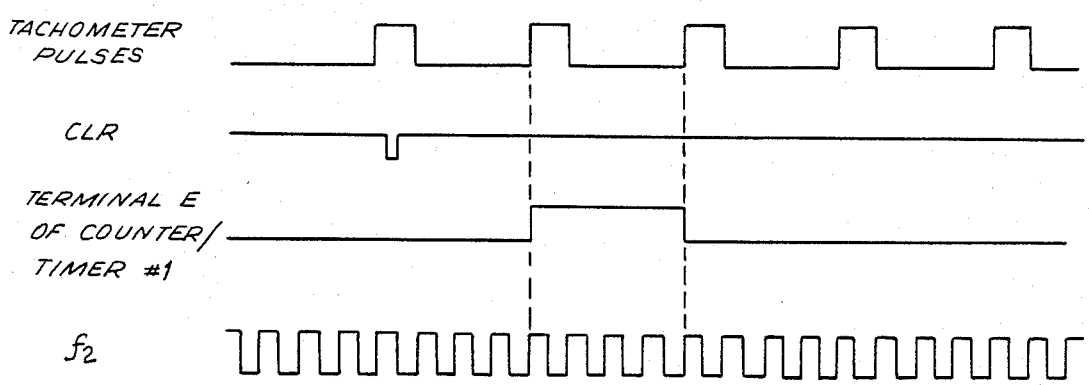
FIG. 3 is a timing chart to which reference will be made in explaining the operation of the embodiment of FIG. 1.
Figure 4:
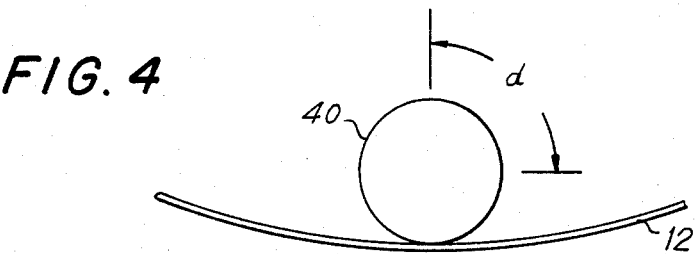
FIG. 4 is a diagrammatic illustration of a tachometer used in a tape machine.

The rising edge of the next tach pulse supplied to gate-time generator 26 causes the enable signal supplied to terminal E of counter/timer 34 to rise to a high level (see FIG. 3). Timer/counter 34 begins counting second clock signals $f_2$ during the interval when the enable signal is high. In a preferred embodiment, each pulse of second clock signal $f_2$ decrements a preset number contained in timer/counter 34.

The rising edge of the next tach pulse supplied to gate-time generator 26 closes the gate interval, i.e., the enable signal drops to a low level, as illustrated in FIG. 3, where the output signal supplied to terminal E drops in response to the third tach pulse.

CPU 28 then reads the contents of timer/counter 34 and calculates the instantaneous velocity of tape 12. In calculating the instantaneous velocity, CPU 28 uses the following relationship between the instantaneous velocity V, the distance d for each quarter revolution of roller 40, and the number N read from timer/counter 34:

$$d = V \times T.$$

Since $f_2 \times T = N$, $$V = \frac{d \times f_2}{N}$$

CPU 28 next generates control signals to tape machine 10 to decrease the speed thereof. The instantaneous velocity $V_F$ of tape 12 is repeatedly measured, as described herein before, until an adequate difference exists between $V_F$ and $V_0$, where $V_0$ is the initial velocity measured when tape 12 is positioned at the brake point.

After the second, lower, instantaneous velocity $V_F$ is calculated, CPU 28 determines the acceleration a (or deceleration) which occurred immediately following the brake point. In determining the acceleration, CPU 28 employs the following relationship:

$$a = (V_0^2 - V_F^2)/2D$$

where D is the distance on magnetic tape 12 between the point where velocity $V_0$ is determined and the point where velocity $V_F$ is determined.

After the instantaneous velocity $V_F$ is calculated, CPU 28 generates control signals to return tape 12 to velocity $V_i$, as indicated in FIG. 2.

CPU 28 then calculates the stop distance S required to stop tape 12 while it is moving at a velocity $V_i$. In performing the calculation, CPU 28 utilizes the following relationship:

$$S = V_i^2/2a$$

After CPU 28 calculates the stop distance S, CPU 28 compares the current position of tape 12 with the distance S required to stop at the target. When the distance to the target equals distance S, CPU 28 generates control signals to place tape machine 10 into a stop mode. In one example, tape machine 10 was not placed into the stop mode until it was within 30 inches of the target.

CPU 28 continues to monitor the speed of tape 12 and adjust it so that a smooth stop is obtained. CPU 28 continued to adjust the speed of tape 12 until tape 12 was within three inches of the target, in one example.

When tape 12 was within three inches of the target, CPU 28 stopped tape machine 10.

Figure 5E:
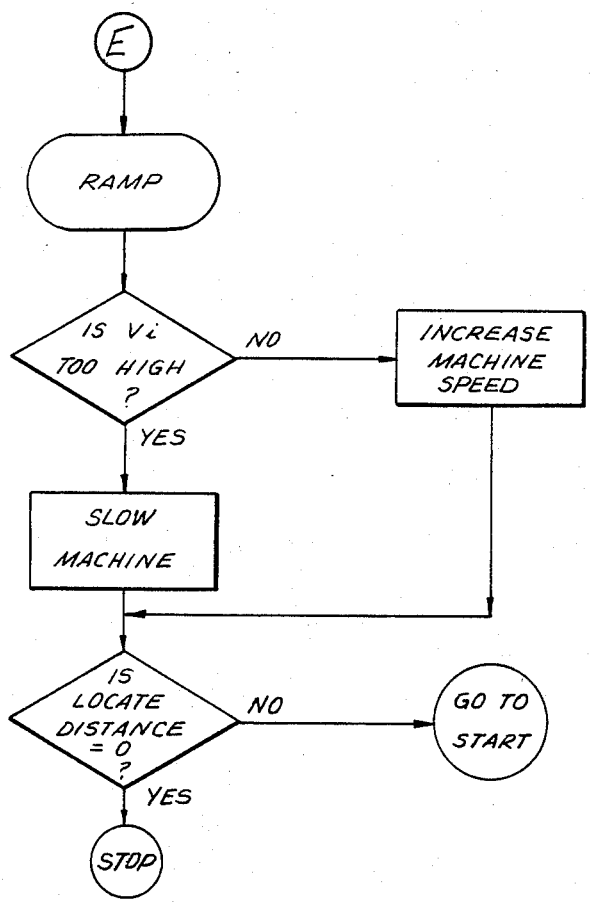
FIGS. 5A to 5E are flow charts illustrating a program for use with a central processing unit in the embodiment of FIG. 1.
Figure 5A:
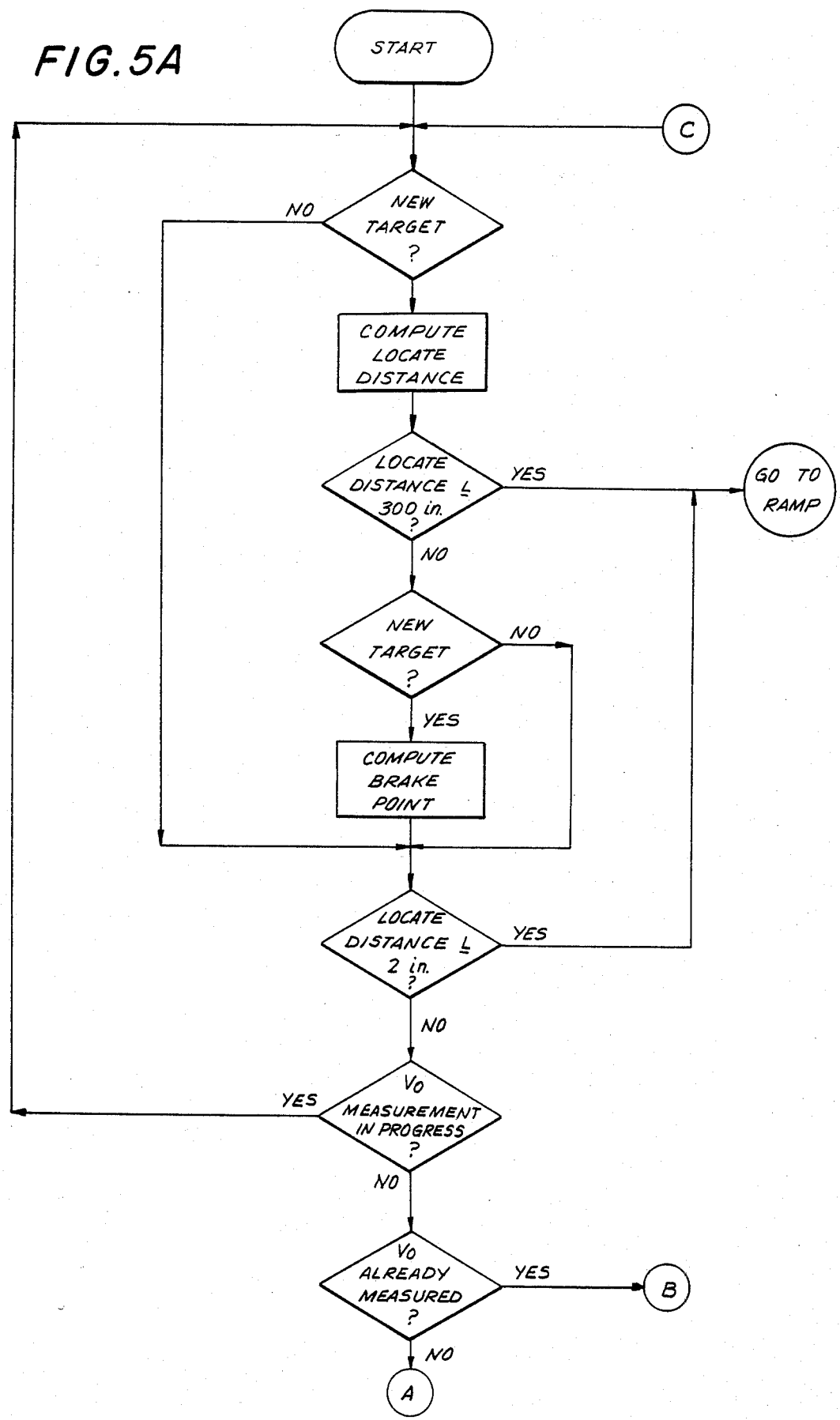

FIGS. 5A to 5E illustrate flow charts for a program which can be used with CPU 28 to effect the above-described operations on tape 12. Referring to initially to FIG. 5A, the flow chart begins at "START" and proceeds to a decision point to determine whether a new target, or a new predetermined point, has been selected for tape 12. If a new target has not been chosen, the program continues to a second decision point. If a new target is requested, the program computes the locate distance to the target, i.e., the distance to the target or predetermined point. After the computation, the program determines whether the locate distance is less than or equal to three hundred inches. If the current point on magnetic tape 12 is within three hundred inches of the target, the program continues at the point marked "RAMP". If the locate distance is more than three hundred inches from the target, a new decision point is reached where it determines whether a new target has been selected. If a new target has been selected, a new brake point is determined. If a new target is not selected, the program reaches another decision point where it determines whether the locate distance is less than or equal to two inches from the target. If the locate distance is within two inches of the target, the program continues at the point marked "RAMP". If the locate distance is not within two inches, the program proceeds to the next decision point where it determines whether the $V_0$ measurement is in progress. If the $V_0$ measurement is in progress, the program returns to the point marked "C". If the $V_0$ measurement is not in progress, the program proceeds to the next decision point where it determines whether the $V_0$ measurement has already been performed. If the $V_0$ measurement has been performed, the program proceeds at point "B". If the $V_0$ measurement has not been performed, the program proceeds to point "A".

Figure 5B:
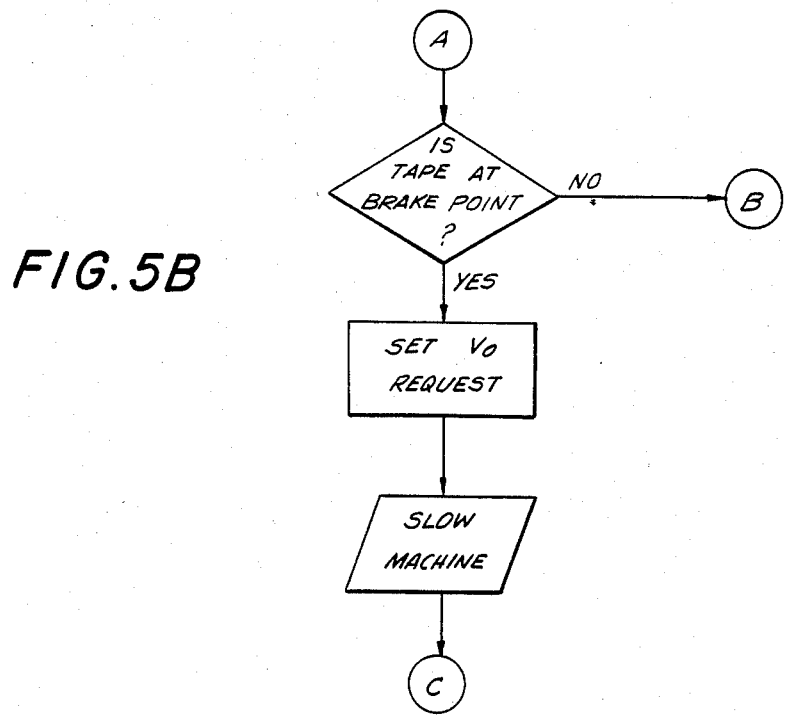

Referring to FIG. 5B, the program enters at point "A" and proceeds to a decision point where it determines whether the tape is at the brake point. If the tape is not at the brake point, the program continues at point "B". If the tape is at the brake point, the program proceeds to set a $V_0$ request and to slow the machine down. The program next proceeds to point "C".

Figure 5C:
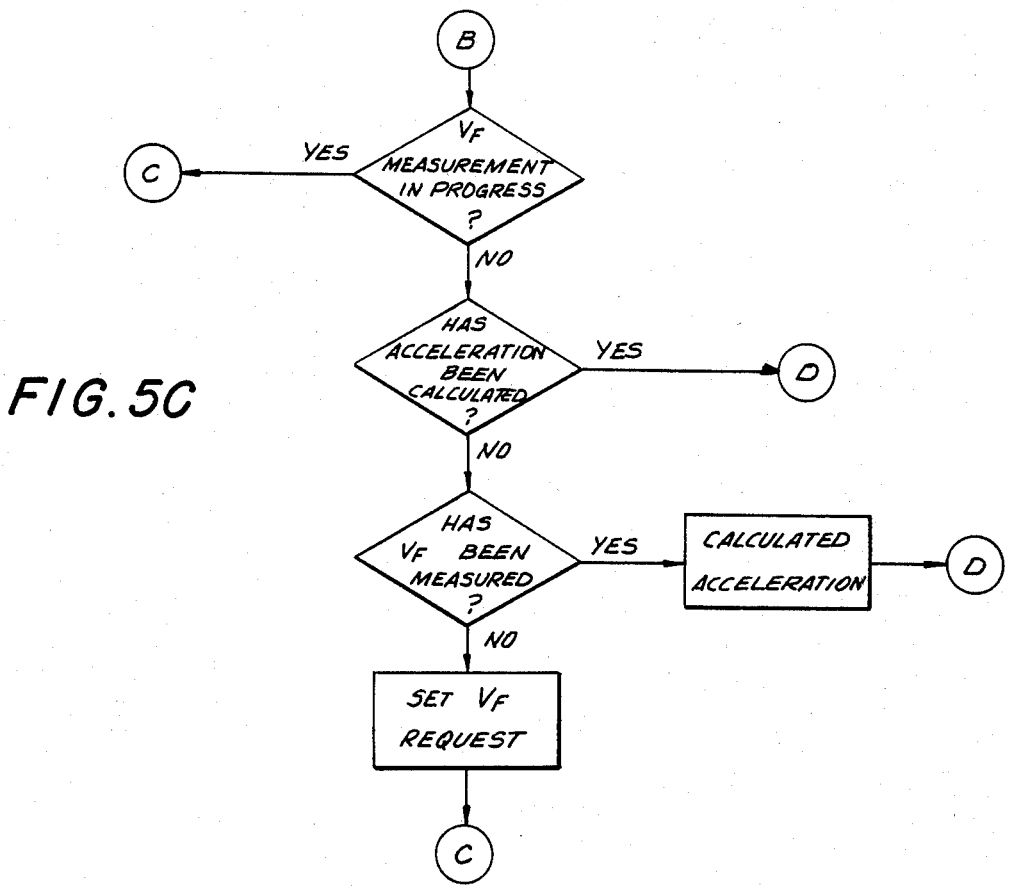

Referring to FIG. 5C, the program enters at point "B" and proceeds to a decision point where it determines whether the $V_F$ measurement is in progress. If the $V_F$ measurement is in progress, the program continues at point "C". If the $V_F$ measurement is not in progress, the program continues at the next decision point. If the acceleration has been calculated, the program continues at point "D". If the acceleration has not been calculated, the program proceeds to the next decision point, where it determines whether $V_F$ has been measured. If $V_F$ has been measured, the acceleration is calculated and the program continues at point "D". If $V_F$ has not been measured, the $V_F$ measurement request is set, and the program continues at point "C".

Figure 5D:
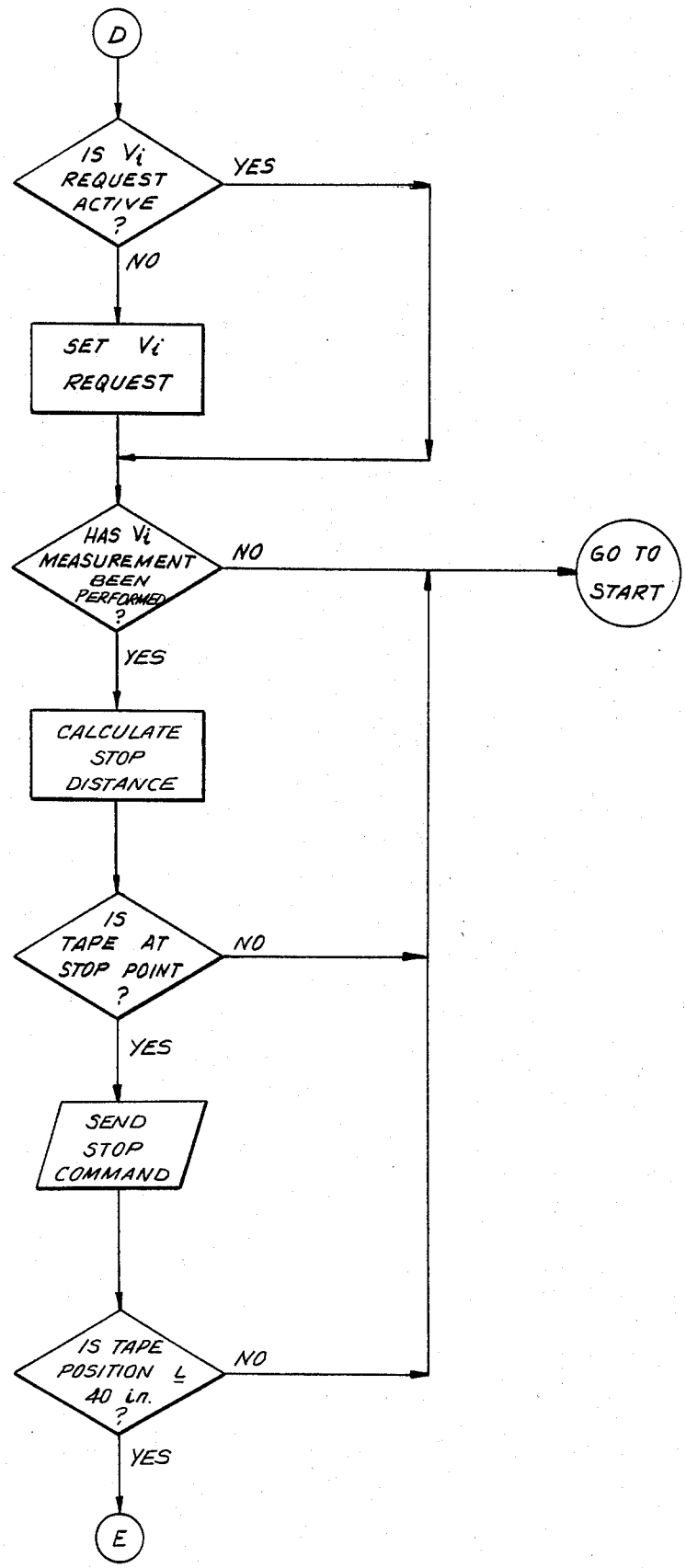

In FIG. 5D, the program enters at point "D" and proceeds to a first decision point to determine whether the $V_i$ request is active, where the velocity of tape 12 is checked after the brake point. If the $V_i$ request is not active, the program proceeds to set the $V_i$ request. If the $V_i$ request is active, the program skips this step and proceeds to the next decision point. At the next decision point, the program determines whether the $V_i$ measurement has been performed. If the $V_i$ measurement has not been performed, the program returns to "START". If the $V_i$ measurement has been performed, the program then proceeds to calculate the stop distance. After calculation of the stop distance, the program proceeds to the next decision point, where it determines whether the tape is positioned at the stop point, i.e., the target. If the tape is not at the stop point, it proceeds to "START". If the tape is at the stop point, the program issues a stop command to the tape machine. After issuing the stop command, the program proceeds to a decision point where it determines if the tape position is less than or equal to forty inches from the target. If the tape position is not within forty inches of the target, it proceeds to "START". If the tape is within forty inches of the target, the program proceeds to point "E".

Referring to FIG. 5E, the program enters from point "E" and proceeds to the point marked "RAMP". From the "RAMP" point, the program proceeds to a decision point where it determines whether $V_i$ is too high. If $V_i$ is too high, the program issues a command to slow the machine down. If $V_i$ is not too high, the program issues a command to increase the machine speed. The program then proceeds to a decision point to determine whether the locate distance is zero, i.e., the tape is at the target. If the locate distance is not zero, the program continues at point "START". If the locate distance is zero, the program stops.

It is thus to be appreciated that the present invention provides a novel method and apparatus for accurately positioning a tape, such as a magnetic tape, at a predetermined point by employing real time measurements of the inertia of the tape.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. In combination with a tape machine having at least one reel with a tape wound thereon, a device for positioning said tape at a predetermined point, said device comprising:

tape speed sensing means for generating speed signals indicative of variations in the speed of said tape while said tape is wound in respect to said reel;

calculator means for receiving said speed signals and calculating the inertia of the wound tape in response thereto; and control means for generating control signals to stop said tape machine with said tape positioned at said predetermined point in response to said calculated inertia of said tape.

2. The combination of claim 1; wherein said calculator means includes timer means for use in calculating said inertia of said tape.

3. The combination of claim 2; wherein said calculator means includes clock means for supplying clock pulses to said timer means.

4. The combination of claim 3; wherein said control means includes central processing means for generating said control signals.

5. The combination of claim 4; wherein said clock means comprises:

oscillator means for generating high frequency pulses; and counter means for receiving said high frequency pulses and generating said clock pulses in response thereto.

6. The combination of claim 5, in which said central processing means has a clock input terminal; and further including means for supplying said high frequency pulses to said clock input terminal of said central processing means.

7. The combination of claim 5; wherein said calculator means includes gate means for actuating said timer means for a predetermined interval.

8. The combination of claim 5; and further including interface means for interfacing with said central processing means.

9. The combination of claim 1, wherein said calculator means begins to calculate said inertia of said tape at a preset distance from said predetermined point on said tape.

10. The combination of claim 9, in which said tape is positioned at an initial point; and wherein said control means generates said control signals to wind said tape at a predetermined speed after said tape is positioned at said initial point.

11. The combination of claim 10; wherein said control means generates control signals to decrease said speed of said tape by a preset amount for said calculation of said inertia.

12. The combination of claim 11; wherein said control means generates control signals to increase said speed of said tape to said predetermined speed after said speed of said tape has been decreased.

13. The combination of claim 12; wherein said calculator means measures a first instantaneous velocity of said tape when said tape is positioned at said preset distance.

14. The combination of claim 13; wherein said calculator means measures a second instantaneous velocity of said tape when said tape speed is decreased.

15. The combination of claim 14; wherein said calculator means calculates the deceleration of said tape as a measure of said inertia from said first and second instantaneous velocities of said tape.

16. The combination of claim 15; wherein said control means generates said control signals to stop said tape at said predetermined point in response to said calculation of said deceleration of said tape.

17. A method of positioning a tape at a predetermined point, said tape being wound on at least one reel of a tape machine, comprising the steps of:
    winding said tape in respect to said reel while moving the tape toward said predetermined point at a preset speed;
    determining the inertia of said tape while said tape is winding; and
    stopping said tape at said predetermined point in response to said determination of said inertia of the wound tape.

18. The method of claim 17; wherein said step of determining said inertia comprises the steps of:
    measuring a first instantaneous velocity of said tape while said tape is moving at said preset speed;
    decreasing said speed of said tape;
    measuring a second instantaneous velocity of said tape at said decreased speed; and
    calculating said inertia from said first and second instantaneous velocities.

19. The method of claim 18; further comprising, after said step of determining said inertia, the additional step of increasing said speed of said tape to said preset speed.

20. The method of claim 19; wherein said step of stopping said tape at said predetermined point comprises the steps of:
    calculating from said determination of said inertia the distance to stop said tape while said tape is winding at said preset speed;
    measuring the distance to said predetermined point on said tape;
    comparing said calculated distance to stop said tape with said measured distance to said predetermined point; and
    stopping said winding of said tape when said distance to stop said tape is the same as said distance to said predetermined point.

21. The method of claim 17; wherein said step of determining said inertia of said tape is performed at a preset distance away from said predetermined point.

* * * * *